(12) United States Patent
Ogawa et al.

(10) Patent No.: US 7,598,325 B2
(45) Date of Patent: Oct. 6, 2009

(54) DIGLYCIDYL/ISOPHORONEDIAMINE ADDUCT, DIGLYCIDYL/1,3-BIS(AMINOMETHYL) CYCLOHEXANE ADDUCT, ISOPHORONEDIAMINE AND 1,3-BIS(AMINOMETHYL)CYCLOHEXANE

(75) Inventors: Shun Ogawa, Hiratsuka (JP); Hisayuki Kuwahara, Hiratsuka (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 451 days.

(21) Appl. No.: 11/656,968

(22) Filed: Jan. 24, 2007

(65) Prior Publication Data

US 2007/0179258 A1 Aug. 2, 2007

(30) Foreign Application Priority Data

Jan. 27, 2006 (JP) ............................. 2006-019358

(51) Int. Cl.
- C08G 59/14 (2006.01)
- C08G 59/50 (2006.01)
- C08L 63/00 (2006.01)
- C08L 63/02 (2006.01)

(52) U.S. Cl. ...................................... 525/526; 528/122

(58) Field of Classification Search ....................... None
See application file for complete search history.

(56) References Cited

U.S. PATENT DOCUMENTS

| 4,348,505 | A | * | 9/1982 | Di Benedetto et al. ...... 525/504 |
| 5,274,054 | A | | 12/1993 | Moser et al. |
| 5,880,228 | A | | 3/1999 | Marten |
| 5,959,061 | A | | 9/1999 | Neumann et al. |
| 6,048,944 | A | | 4/2000 | Epple et al. |
| 6,528,595 | B1 | * | 3/2003 | Ikawa et al. .................. 525/525 |
| 2006/0003166 | A1 | * | 1/2006 | Wissing et al. .............. 428/413 |

* cited by examiner

*Primary Examiner*—Robert Sellers
(74) *Attorney, Agent, or Firm*—Wenderoth, Lind & Ponack, L.L.P.

(57) ABSTRACT

The present invention relates to a curing agent for epoxy resins comprising (A) an epoxy adduct of isophoronediamine, (B) an epoxy adduct of 1,3-bis(aminomethyl) cyclohexane, (C) isophoronediamine and (D) 1,3-bis (aminomethyl) cyclohexane wherein the weight ratio of (D) to (C) (=(D)/(C)) in said curing agent is in the range of 0.04 to 0.22, which can provide an epoxy resin composition with excellent curing performances such as curability under the condition of low temperature, excellent performances of epoxy resin cured coating films, excellent chemical resistance of epoxy resin cured coating films and excellent physical properties of epoxy resin cured products.

14 Claims, No Drawings

DIGLYCIDYL/ISOPHORONEDIAMINE ADDUCT, DIGLYCIDYL/1,3-BIS(AMINOMETHYL) CYCLOHEXANE ADDUCT, ISOPHORONEDIAMINE AND 1,3-BIS(AMINOMETHYL)CYCLOHEXANE

BACKGROUND OF THE INVENTION

1) Field of the Invention

The present invention relates to a curing agent for epoxy resins comprising a reaction product of diamine and a diglycidyl compound, an epoxy resin composition comprising said curing agent for epoxy resins and an epoxy resin cured product obtained by curing said epoxy resin composition.

2) Related Art

It has been well known that various polyamine compounds are widely used as a curing agent for epoxy resins and a raw material thereof. The room-temperature curable epoxy resin compositions using these curing agents for epoxy resins are particularly utilized widely in a field of coating materials such as a corrosion-resistant paint for ships, bridges and land and marine iron structures and a field of civil engineering and construction such as materials for lining, reinforcement or repair of concrete structures, flooring materials of buildings, linings of water supply and sewerage systems, pavement materials, and adhesive materials.

Among these polyamine compounds, a curing agent for epoxy resin using isophoronediamine as a raw material has features such that it provides a coating film excellent in both gloss and leveling and a cured product excellent in both water resistance and chemical resistance compared with a curing agent for epoxy resin containing an aliphatic polyamino compound or a curing agent for epoxy resin using an aliphatic polyamino compound as a raw material. (See "New Development Of A Curing Agent For Epoxy Resins" edited by Hiroshi Kakiuchi, published by CMC Co. Ltd., P 41-49, May 31, 1994)

However, since a curing agent for epoxy resins using isophoronediamine as a raw material has low reactivity with epoxy resins at low temperature, it has such problems that it takes long time to cure or it is difficult to obtain intended performances because the curing reaction does not proceed sufficiently.

SUMMARY OF THE INVENTION

An object of the present invention is to provide a curing agent for epoxy resins using a polyamine compound which can provide excellent curing performances, especially excellent curing performances at low temperature, excellent performances of epoxy resin cured coating films and excellent properties of epoxy resin cured products; an epoxy resin composition comprising said curing agent composition for epoxy resins; and an epoxy resin cured product obtained by curing said epoxy resin composition.

As a result of extensive studies, the inventors have found that an epoxy resin composition using a curing agent for epoxy resins comprising isophoronediamine, 1,3-bis (aminomethyl) cyclohexane and the epoxy adducts thereof wherein the weight ratio of isophoronediamine and 1,3-bis (aminomethyl) cyclohexane is within the specific range has excellent curing performances, especially curing performances at low temperature.

Therefore, the present invention provides a curing agent for epoxy resins, an epoxy resin composition and an epoxy resin cured product obtained by curing said epoxy resin composition described as follows:

1) A curing agent for epoxy resins comprising the following components (A), (B), (C) and (D) wherein the weight ratio of (D) to (C) (=(D)/(C)) in said curing agent is in the range of 0.04 to 0.22:

(A) an epoxy adduct of isophoronediamine obtained by addition reaction of isophoronediamine with a diglycidyl compound (B) an epoxy adduct of 1,3-bis(aminomethyl) cyclohexane obtained by addition reaction of 1,3-bis(aminomethyl) cyclohexane with a diglycidyl compound (C) isophoronediamine (D) 1,3-bis (aminomethyl) cyclohexane 2) The curing agent for epoxy resins according to claim 1, wherein the weight ratio of the total content of epoxy adducts to the total content of diamines (=[the total content of epoxy adducts]/[the total content of diamines]) is in the range of 0.17 to 4.2.

3) The curing agent for epoxy resins according to claim 1 or 2, wherein the reaction proportion in addition reaction of isophoronediamine with the diglycidyl compound (=[the number of amino groups]/[the number of glycidyl groups]) is in the range of 3 to 10.

4) The curing agent for epoxy resins according to claims 1 to 3, wherein the reaction proportion in addition reaction of 1,3-bis (aminomethyl) cyclohexane with the diglycidyl compound (=[the number of amino groups]/[the number of glycidyl groups]) is in the range of 3 to 10.

5) The curing agent for epoxy resins according to claims 1 to 4, wherein the diglycidyl compound added with isophoronediamine is selected from the group consisting of 4,4'-isopropylidenediphenol diglycidylether and 4,4'-methylenediphenol diglycidylether.

6) The curing agent for epoxy resins according to claims 1 to 5, wherein the diglycidyl compound added with 1,3-bis (aminomethyl) cyclohexane is selected from the group consisting of 4,4'-isopropylidenediphenol diglycidylether and 4,4'-methylenediphenol diglycidylether.

7) An epoxy resin composition comprising an epoxy resin and the curing agent for epoxy resins according to claims 1 to 6.

8) An epoxy resin cured product obtained by curing the epoxy resin composition according to claim 7.

The curing agent for epoxy resins of the present invention can provide an epoxy resin composition with excellent curing performances, excellent performances of epoxy resin cured coating films, excellent chemical resistance of epoxy resin cured coating films and excellent physical properties of epoxy resin cured products. Especially, the curing agent for epoxy resins of the present invention can provide an epoxy resin composition with excellent curing performance under the condition of low temperature.

DETAILED DESCRIPTION OF THE INVENTION

The curing agent for epoxy resins of the present invention comprises component (A); an epoxy adduct of isophoronediamine obtained by addition reaction of isophoronediamine with a diglycidyl compound, component (B); an epoxy adduct of 1,3-bis(aminomethyl) cyclohexane obtained by addition reaction of 1,3-bis(aminomethyl) cyclohexane with a diglycidyl compound, component (C) isophoronediamine; and component (D) 1,3-bis (aminomethyl) cyclohexane.

The component (A) of the present invention, an epoxy adduct of isophoronediamine, is a reaction product obtained by addition reaction of isophoronediamine with a diglycidyl compound. The component (B) of the present invention, an epoxy adduct of 1,3-bis(aminomethyl) cyclohexane is a reaction product obtained by addition reaction of 1,3-bis(aminomethyl) cyclohexane with a diglycidyl compound. Hereinafter, isophoronediamine or 1,3-bis(aminomethyl) cyclohexane may simply be mentioned as "diamine".

In the reaction between a diamine and a diglycidyl compound, the amino groups of the diamine react with glycidyl groups of the diglycidyl compound. This kind of reaction can be described as addition reaction wherein the amino group of the diamine is added with the glycidyl group of the diglycidyl compound. Accordingly, the reaction product of a diamine and a diglycidyl compound can be described as an epoxy adduct obtained by adding a diglycidyl compound with a diamine.

Examples of epoxy adducts obtained by addition reaction of isophoronediamine or 1,3-bis (aminomethyl) cyclohexane with the glycidyl compound of the present invention include compounds having the following structures (a) to (d), though the usable epoxy adducts should not be limited to them.

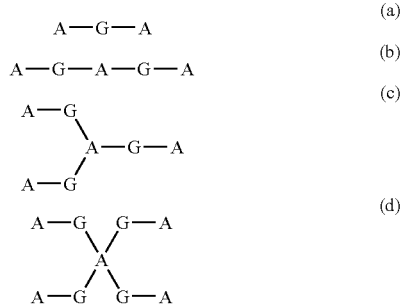

In the above structures (a) to (d), "A" represents a diamine residue and "G" represents a diglycidyl compound residue.

The components (A) and (B) which are reaction products of a diamine with diglycidyl compounds of the present invention are a mixture of the addition products having various structures selected from the compounds represented by the above-described structures (a) to (d).

The diglycidyl compound usable in the present invention is a compound having two glycidyl groups (epoxy groups) in a molecule reactive with active hydrogen atoms derived from amino groups of isophoronediamine or 1,3-bis (aminomethyl) cyclohexane.

Suitable diglycidyl compounds include diglycidylether compounds of mononuclear divalent phenols such as resorcinol and hydroquinone; diglycidylether compounds of multinuclear divalent phenols such as 4,4'-isopropylidene diphenol (bisphenol A) and 4,4'-methylene diphenol (bisphenol F); diglycidylether compounds of diols such as ethyleneglycol, propyleneglycol, butanediol and hexanediol; and diglycidylester compounds of aliphatic, aromatic or alicyclic dibasic acids such as maleic acid, fumaric acid, itaconic acid, succinic acid, glutaric acid, suberic acid, adipic acid, azelaic acid, sebacic acid, phthalic acid, isophthalic acid, terephthalic acid and cyclohexane dicarboxylic acid. Among them, 4,4'-isopropylidenediphenol diglycidylether (a bisphenol A-type epoxy resin) and 4,4'-methylenediphenol diglycidylether (a bisphenol F-type epoxy resin) are preferable. Especially, 4,4'-isopropylidenediphenol diglycidylether (a bisphenol A-type epoxy resin) is most preferable.

These diglycidyl compounds to be reacted with isophoronediamine or 1,3-bis (aminomethyl) cyclohexane may be used each independently, or two or more of them may be used in combination. In the case of using two or more of the diglycidyl compounds in combination, the two or more diglycidyl compounds may be mixed in advance of reacting with isophoronediamine or 1,3-bis (aminomethyl) cyclohexane, or may be reacted one by one with isophoronediamine or 1,3-bis (aminomethyl) cyclohexane sequentially. The diglycidyl compound to be reacted with isophoronediamine and the diglycidyl compound to be reacted with 1,3-bis (aminomethyl) cyclohexane may be same or may be different with each other.

The reaction proportion of isophoronediamine and the diglycidyl compound (=[the number of amino groups]/[the number of glycidyl groups]) is preferably in the range of 3 to 10, more preferably in the range of 4 to 8. The reaction proportion of 1,3-bis (aminomethyl) cyclohexane and the diglycidyl compound is preferably in the range of 3 to 10, more preferably in the range of 4 to 8.

When the reaction proportion is more than 10, the gloss, leveling, water resistance and the like of cured coating films may be deteriorated. When the reaction proportion is more than 3, the viscosity may become extremely high to deteriorate workability.

The curing agent for epoxy resins of the present invention comprises isophoronediamine (component (C)) and 1,3-bis (aminomethyl) cyclohexane (component (D)) besides the above-mentioned component (A) and (B).

The content of isophoronediamine (component (C)) is preferably 18.5-70.2% by weight, more preferably 25.7-63.1% by weight based upon the total weight of the curing agent for epoxy resins of the present invention. The content of 1,3-bis (aminomethyl) cyclohexane (component (D)) is preferably 0.8-15.4% by weight, more preferably 1.0-13.9% by weight based upon the total weight of the curing agent for epoxy resins of the present invention.

When the content of the component (C) is too low, water resistance may be deteriorated. When the content of the component (C) is too high, curing performance under the condition of low temperature may be deteriorated. When the content of the component (D) is too low, curing performance under the condition of low temperature may be deteriorated. When the content of the component (D) is too high, water resistance may be deteriorated.

In the curing agent for epoxy resins of the present invention, the weight ratio of isophoronediamine (C) and 1,3-bis (aminomethyl) cyclohexane (D) (1,3-bis (aminomethyl) cyclohexane/isophoronediamine=(D)/(C)) is necessary to be in the range of 0.04 to 0.22. Preferable range of (D)/(C) is 0.06 to 0.18, most preferable range is 0.08 to 0.14.

When the weight range is less than 0.04, improvement of curing performance under the condition of low temperature and appearance of epoxy resin cured coating films may be insufficient. When the weight range is more than 0.22, water resistance of epoxy resin cured coating films may be deteriorated.

Though the ratio of the total content of epoxy adducts and the total content of diamines (=(C)+(D)) is not limited, it is preferable to control the proportion of the components so that the weight ratio of the total content of epoxy adducts to the total content of diamines (=[the total content of epoxy adducts]/[the total content of diamines]) becomes within the range of 0.17 to 4.2, more preferably within the range of 0.30 to 2.7. When the ratio of the total content of epoxy adducts is too low, curing performance and water resistance may be deteriorated. When the ratio of the total content of epoxy adducts is too high, the viscosity may become extremely high to deteriorate workability.

As a method for reacting the glycidyl compound with isophoronediamine or 1,3-bis (aminomethyl) cyclohexane, well-known methods can be employed. Examples include a method of firstly feeding into a reactor as much amount of isophoronediamine, 1,3-bis (aminomethyl) cyclohexane or a mixture of isophoronediamine and 1,3-bis(aminomethyl) cyclohexane as the number of active hydrogen atoms of the diamines is excess to the number of glycidyl groups (epoxy groups) of the diglycidyl compounds, then adding the glycidyl compound dropwise therein and starting the reaction by heating.

The reaction temperature and the reaction time are not limited. For example, after the temperature of isophoronediamine, 1,3-bis (aminomethyl) cyclohexane or a mixture of isophoronediamine and 1,3-bis(aminomethyl) cyclohexane is raised to 80° C., the diglycidyl compound is added dropwise maintaining the temperature of reaction liquid in the range of 80 to 90° C. After completing adding dropwise, the temperature is raised to 100° C. to conduct the reaction for 2 hours. Then, the completion of reaction is determined by confirming diminish of glycidyl groups with IR spectroscopic analysis.

The reaction products of isophoronediamine or 1,3-bis (aminomethyl) cyclohexane and the diglycidyl compound thus obtained comprises epoxy adducts having various structures of (a) to (d) as described above and unreacted diamines, i.e. unreacted isophoronediamine or 1,3-bis (aminomethyl) cyclohexane.

The method for producing intended compositions of the curing agent for epoxy resins of the present invention is not limited. For example, it can be obtained by simply blending the reaction product of isophoronediamine with the diglycidyl compound obtained by the above-mentioned method comprising the epoxy adduct and unreacted isophoronediamine and the reaction product of 1,3-bis (aminomethyl) cyclohexane with the diglycidyl compound obtained in the same method comprising the epoxy adduct and unreacted 1,3-bis (aminomethyl) cyclohexane. In addition, isophoronediamine or 1,3-bis (aminomethyl) cyclohexane can further be added to the blended mixture thus obtained so that the weight ratio of isophoronediamine and 1,3-bis (aminomethyl) cyclohexane falls within the above-mentioned range.

Alternatively, intended compositions of the curing agent for epoxy resins of the present invention can be obtained by blending the epoxy adduct of isophoronediamine and the diglycidyl compound separated and purified from the reaction product of isophoronediamine with the diglycidyl compound obtained by above-mentioned method and the epoxy adduct of 1,3-bis (aminomethyl) cyclohexane and the diglycidyl compound separated and purified from the reaction product of 1,3-bis (aminomethyl) cyclohexane with the diglycidyl compound obtained in the same method, then further adding isophoronediamine or 1,3-bis (aminomethyl) cyclohexane with the blend to control the weight ratio of isophoronediamine and 1,3-bis (aminomethyl) cyclohexane to come to the above-mentioned range.

The curing agent for epoxy resins of the present invention can be used independently or used as a mixture with other polyamine compounds. When used as a mixture with other polyamine compounds, examples of the other polyamine compounds include aliphatic polyamines such as ethylenediamine, diethylenetriamine, triethylenetetramine, tetraethylenepentamine, pentaethylenehexamine and hexamethylenediamine; aliphatic polyamines having aromatic rings such as xylylenediamine; alicyclic polyamines such as menthanediamine and N-aminomethylpiperazine; aromatic polyamines such as phenylenediamine, diaminodiphenylmethane and diaminodiphenylsulfone; polyamino compounds having a polyether structure; and polyamino compounds having a norbornane structure.

These polyamino compounds can be blended without modification, or be blended after modification such as amide-modification by reacting with a compound having carboxyl groups, adduct-modification by addition reaction with epoxy compounds, Mannich modification by reacting with formaldehyde and phenol.

In this case, the content of other polyamino compounds should not be limited as long as the feature of the curing agent for epoxy resins of the present invention is not diminished. The preferable content of other polyamino compounds is not more than 100 parts by weight based upon 100 parts by weight of the curing agent for epoxy resins of the present invention.

The epoxy resin composition of the present invention comprises an epoxy resin as a base resin and the above-mentioned curing agent for epoxy resins of the present invention. The epoxy resin used as a base resin in the present invention should not be limited as long as it has glycidyl groups reactive with active hydrogen atoms derived from amino groups containing in the curing agent for epoxy resins of the present invention.

Examples of epoxy resins include multifunctional epoxy resins and monofunctional epoxy resins.

Examples of multifunctional epoxy resins include diglycidylether compounds of mononuclear divalent phenols such as resorcinol and hydroquinone; diglycidylether compounds of multinuclear divalent phenols such as 4,4'-isopropylidene diphenol (bisphenol A) and 4,4'-methylene diphenol (bisphenol F); diglycidylether compounds of diols such as ethyleneglycol, propyleneglycol, butanediol and hexanediol; diglycidylester compounds of aliphatic, aromatic or alicyclic dibasic acids such as maleic acid, fumaric acid, itaconic acid, succinic acid, glutaric acid, suberic acid, adipic acid, azelaic acid, sebacic acid, phthalic acid, isophthalic acid, terephthalic acid and cyclohexane dicarboxylic acid; glycidyl amine compounds such as 1,3-bis (N,N-diglycidyl aminomethyl) benzene and 1,3-bis (N,N-diglycidyl aminomethyl) cyclohexane.

Examples of monofunctional epoxy resins include glycidylether compounds with alcohol such as butyl alcohol or higher alcohols; glycidylether compounds with mononuclear monovalent phenol compounds such as phenol, metacresol, paracresol and orthocresol; and glycidylester compounds with monovalent carboxylic acids such as neodecanoic acid.

Among them, it is preferable to use 4,4'-isopropylidene diphenol diglycidylether (a bisphenol A-type epoxy resin), 4,4'-methylene diphenol diglycidylether (a bisphenol F-type epoxy resin) or the mixture thereof as a main component of the epoxy resin.

In addition, in the case of using a bisphenol A-type epoxy resin and/or a bisphenol F-type epoxy resin as a main component of the epoxy resin, it is possible to use a small amount of other epoxy resins having glycidyl groups such as diglycidyl ether compounds of diols and monofunctional diglycidyl compounds as a reactive diluent, besides the bisphenol A-type epoxy resin and the bisphenol F-type epoxy resin. Examples of diglycidyl ether compounds of diols include 1,4-butanediol diglycidylether and 1,6-hexanediol diglycidylether. Examples of monofunctional diglycidyl compounds include butylglycidylether, phenylglycidylether, metacresylglycidylether, paracresylglycidylether, orthocresylglycidylether and glycidyl neodecanoate.

Further, components for modification such as filler and plasticizer, components for adjusting fluidity such as a non-reactive diluent and a thixotropic agent, ingredients such as a pigment and a tackifier, additives such as an anti-cissing agent, a leveling agent, an antifoaming agent, an ultraviolet absorber, a light stabilizer and a curing accelerator can be added to the epoxy resin composition of the present invention according to the intended use, insofar as the effect of the present invention is not impaired.

Examples of the non-reacted diluents include plasticizers such as dibutyl phthalate and dioctyl phthalate, liquid resins such as a xylene resin and a toluene resin, alcohols such as benzyl alcohol and butyldiglycol. These diluents can be used insofar as the effect of the present invention is not impaired.

The curing accelerators usable in the present invention should not be limited. Examples of the curing accelerators include tertiary amines such as trimethylamine, ethyldimethylamine, propyldimethylamine, N,N'-dimethylpiperazine, pyridine, picoline, 1.8-diazabiscyclo(5.4.0)undecene-1 (DBU), benzyldimethylamine, 2-(dimethylaminomethyl) phenol (DMP-10) and 2,4,6-tris(dimethylaminomethyl)phenol (DMP-30); phenols such as phenolnovolak, o-cresolnovolak, p-cresolnovolak, t-butylphenolnovolak and cyclopentadienecresol. These curing accelerators can be used insofar as the effect of the present invention is not impaired.

As for the mix proportion of epoxy resins and curing agents for epoxy resins in the epoxy resin composition of the present invention, it is preferable that the ratio of the number of active hydrogen atoms in the curing agent for epoxy resins to the number of epoxy groups of the epoxy resin is in the range of 0.7 to 1.2. When the number of active hydrogen atoms in the curing agent for epoxy resins to the number of epoxy groups of the epoxy resin is less than 0.7, the degree of cross-linkage of cured products may be insufficient. When the number of active hydrogen atoms in the curing agent for epoxy resins to the number of epoxy groups of the epoxy resin is more than 1.2, the excess amount of hydrophilic amino groups may bring about deterioration of water resistance.

The epoxy resin composition of the present invention can be cured by well known methods to produce an epoxy resin cured product. The curing conditions can be appropriately selected according to the intended purpose insofar as the effect of the present invention is not impaired.

PREFERRED EMBODIMENT OF THE INVENTION

Hereinafter, the present invention will be concretely described with reference to the examples, which are not intended to limit the scope of the present invention.

Determination of the content of isophoronediamine and the content 1,3-bis(aminomethyl) cyclohexane, and evaluation of properties of epoxy resin cured coating films were carried out by the following methods:

[Determination of the Content of Isophoronediamine]

The content of isophoronediamine was determined by Gas Chromatography analysis under the following conditions:

Gas Chromatograph detector: trade name "GC-390B", manufactured by GL sciences Inc.

Column: trade name "CP-Sil8CB", manufactured by Varian CHROMPACK International, Varian, Inc.; length 30 m, film thickness 2.5 μm, inner diameter 0.25 mm.

Carrier gas: Helium

Flow rate: 1.2 ml/min

Internal standard: diphenylether

Solvent: methanol

Injection volume: 0.5 μl

Temperature conditions; INJ, DET: 300° C., COL: 150° C.

Retention time: 5.5 min

[Determination of the Content of 1,3-bis (Aminomethyl) Cyclohexane]

The content of 1,3-bis (aminomethyl) cyclohexane was determined by Gas Chromatography analysis under the following conditions:

Gas Chromatograph detector: trade name; "GC-390B", manufactured by GL sciences Inc.

Column: trade name "CP-Sil8CB", manufactured by Varian CHROMPACK International, Varian, Inc.; length 30 m, film thickness 2.5 μm, inner diameter 0.25 mm.

Carrier gas: Helium

Flow rate: 1.2 ml/min

Internal standard: diphenylether

Solvent: methanol

Injection volume: 0.5 μl

Temperature conditions; INJ, DET: 300° C., COL: 150° C.

Retention time: 5.1 min

[Evaluation of Properties of Epoxy Resin Cured Coating Films]

An epoxy resin composition was coated on a cold rolled steel plate (SPCC-SB), treated with #240 sand paper and defatted with xylene in accordance with JIS-G-3141, with thickness of 200 μm under the conditions of 10° C. and 80% RH.

a) Appearance:

The appearance of a coating film aged for 7 days after coating and curing was evaluated visually (gloss, clarity, leveling) based on the following 4 stages of criteria:

⊚; Excellent, ○; good Δ; fair X; poor.

b) Curing Performance:

The curing performance of a coating film aged for 1 day, 4 days and 7 days after coating and curing performance was evaluated by measuring pencil hardness in accordance with JIS-K-5600-5-4.

c) Water Resistance:

Water droplets were dropped on coating films aged for 16 hours, 1 day, 4 days and 7 days after curing. Change of the appearance of the coating films passed 1 day after dropping was evaluated visually based on the following 4 stages of criteria:

⊚; Excellent, ○; good Δ; fair X; poor.

EXAMPLE OF SYNTHESIS 1

213.6 g of 1,3-bis(aminomethyl)cyclohexane, manufactured by Mitsubishi Gas Chemical Co., Inc., in Japan (hereinafter, "1,3-BAC") was charged to a separable flask with internal volume of 0.5 L (liter) equipped with an agitator, a thermometer, a nitrogen gas inlet, a dropping funnel and a condenser.

Then, its temperature was raised to 80° C. in a nitrogen gas stream with stirring. Maintaining the temperature at 80° C., 111.6 g of a Bisphenol A-type epoxy resin with an epoxy equivalent of 186 g/eq, manufactured by Japan Epoxy Resins Co., Ltd., trade name; "Epikote 828" (hereinafter, "DGEBA"), was added thereto dropwise over 1 hour. After the completion of dropwise addition, its temperature was raised to 100° C. to conduct reaction for 2 hours. Thus, 324.3 g of an adduct of DGEBA with 1,3-BAC (herein after, "reaction product A") was obtained. The content of unreacted 1,3-bis (aminomethyl) cyclohexane in the reaction product A was 41.7 wt %.

EXAMPLE OF SYNTHESIS 2

255.5 g of isophoronediamine, manufactured by Huels Japan Ltd. (hereinafter, "IPDA"), was charged to a flask similar as the one used in Example of Synthesis 1. Then, its temperature was raised to 80° C. in a nitrogen gas stream with stirring. Maintaining the temperature at 80° C., 69.8 g of DGEBA was added thereto dropwise over 1 hour. After the completion of dropwise addition, its temperature was raised to 100° C. to conduct reaction for 2 hours. Thus, 324.7 g of an adduct of DGEBA with IPDA (herein after, "reaction product B") was obtained. The content of unreacted isophoronediamine in the reaction product B was 66.0 wt %.

EXAMPLE OF SYNTHESIS 3

255.5 g of isophoronediamine was charged to a flask similar as the one used in Example of Synthesis 1. Then, its temperature was raised to 80° C. in a nitrogen gas stream with stirring. Maintaining the temperature at 80° C., 111.6 g of DGEBA was added thereto dropwise over 1 hour. After the completion of dropwise addition, its temperature was raised to 100° C. to conduct reaction for 2 hours. Thus, 366.3 g of an adduct of DGEBA with IPDA (herein after, "reaction product C") was obtained. The content of unreacted isophoronediamine in the reaction product C was 43.6 wt %.

EXAMPLE OF SYNTHESIS 4

241.8 g of 1,3-bis (aminomethyl) cyclohexane was charged to a flask similar as the one used in Example of Synthesis 1. Then, its temperature was raised to 80° C. in a nitrogen gas stream with stirring. Maintaining the temperature at 80° C., 114.2 g of a Bisphenol F-type epoxy resin with an epoxy equivalent of 169 g/eq, manufactured by Japan Epoxy Resins Co., Ltd., trade name; "Epikote 807" (hereinafter, "DGEBF") was added thereto dropwise over 1 hour. After the completion of dropwise addition, its temperature was raised to 100° C. to conduct reaction for 2 hours. Thus, 355.3 g of an adduct of DGEBF with 1,3-BAC (herein after, "reaction product D") was obtained. The content of unreacted 1,3-bis (aminomethyl) cyclohexane in the reaction product D was 44.9 wt %.

EXAMPLE OF SYNTHESIS 4

255.5 g of isophoronediamine was charged to a flask similar as the one used in Example of Synthesis 1. Then, its temperature was raised to 80° C. in a nitrogen gas stream with stirring. Maintaining the temperature at 80° C., 100.8 g of DGEBF was added thereto dropwise over 1 hour. After the completion of dropwise addition, its temperature was raised to 100° C. to conduct reaction for 2 hours. Thus, 355.1 g of an adduct of DGEBF with IPDA (herein after, "reaction product E") was obtained. The content of unreacted isophoronediamine in the reaction product E was 46.0 wt %.

EXAMPLE 1

9.0 g of the reaction product A obtained by Example of Synthesis 1 and 81.0 g of the reaction product B obtained by Example of Synthesis 2 were weighed and charged to a glass mayonnaise bottle (a thick-walled wide-mouthed bottle) with the volume of 145 ml. 10.0 g of benzyl alcohol as a diluent was added thereto and stirred for 2 minutes at a temperature of 60° C., whereby 100 g of "a curing agent for epoxy resins A" was obtained.

The weight ratio of isophoronediamine and 1,3-bis (aminomethyl) cyclohexane (=[1,3-BAC/IPDA]) in the curing agent for epoxy resins A thus obtained was 0.07.

The curing agent for epoxy resins A was blended with DGEBF at a proportion shown in Table 1 to obtain an epoxy resin composition. The epoxy resin composition thus obtained was cured under the conditions of 10° C. and 80% RH to prepare an epoxy resin cured coating film. The properties of the epoxy resin cured coating film were evaluated. The results were shown in Table 1.

EXAMPLE 2

18.0 g of the reaction product A obtained by Example of Synthesis 1 and 72.0 g of the reaction product B obtained by Example of Synthesis 2 were weighed and charged to a glass mayonnaise bottle with the volume of 145 ml. 10.0 g of benzyl alcohol as a diluent was added thereto and stirred for 2 minutes at a temperature of 60° C., whereby 100 g of "a curing agent for epoxy resins B" was obtained.

The weight ratio of isophoronediamine and 1,3-bis (aminomethyl) cyclohexane (=[1,3-BAC/IPDA]) in the curing agent for epoxy resins B thus obtained was 0.16.

The curing agent for epoxy resins B was blended with DGEBF at a proportion shown in Table 1 to obtain an epoxy resin composition. The epoxy resin composition thus obtained was cured under the conditions of 10° C. and 80% RH to prepare an epoxy resin cured coating film. The properties of the epoxy resin cured coating film were evaluated. The results were shown in Table 1.

EXAMPLE 3

4.0 g of the reaction product A obtained by Example of Synthesis 1 and 76.0 g of the reaction product C obtained by Example of Synthesis 3 were weighed and charged to a glass mayonnaise bottle with the volume of 145 ml. 20.0 g of benzyl alcohol as a diluent was added thereto and stirred for 2 minutes at a temperature of 60° C., whereby 100 g of "a curing agent for epoxy resins C" was obtained.

The weight ratio of isophoronediamine and 1,3-bis (aminomethyl) cyclohexane (=[1,3-BAC/IPDA]) in the curing agent for epoxy resins C thus obtained was 0.05.

The curing agent for epoxy resins C was blended with DGEBF at a proportion shown in Table 1 to obtain an epoxy resin composition. The epoxy resin composition thus obtained was cured under the conditions of 10° C. and 80%

RH to prepare an epoxy resin cured coating film. The properties of the epoxy resin cured coating film were evaluated. The results were shown in Table 1.

EXAMPLE 4

8.0 g of the reaction product A obtained by Example of Synthesis 1 and 72.0 g of the reaction product C obtained by Example of Synthesis 3 were weighed and charged to a glass mayonnaise bottle with the volume of 145 ml. 20.0 g of benzyl alcohol as a diluent was added thereto and stirred for 2 minutes at a temperature of 60° C., whereby 100 g of "a curing agent for epoxy resins D" was obtained.

The weight ratio of isophoronediamine and 1,3-bis (aminomethyl) cyclohexane (=[1,3-BAC/IPDA]) in the curing agent for epoxy resins D thus obtained was 0.11.

The curing agent for epoxy resins D was blended with DGEBF at a proportion shown in Table 1 to obtain an epoxy resin composition. The epoxy resin composition thus obtained was cured under the conditions of 10° C. and 80% RH to prepare an epoxy resin cured coating film. The properties of the epoxy resin cured coating film were evaluated. The results were shown in Table 1.

EXAMPLE 5

9.0 g of the reaction product D obtained by Example of Synthesis 4 and 81.0 g of the reaction product E obtained by Example of Synthesis 5 were weighed and charged to a glass mayonnaise bottle with the volume of 145 ml. 10.0 g of benzyl alcohol as a diluent was added thereto and stirred for 2 minutes at a temperature of 60° C., whereby 100 g of "a curing agent for epoxy resins E" was obtained.

The weight ratio of isophoronediamine and 1,3-bis (aminomethyl) cyclohexane (=[1,3-BAC/IPDA]) in the curing agent for epoxy resins E thus obtained was 0.11.

The curing agent for epoxy resins E was blended with DGEBF at a proportion shown in Table 2 to obtain an epoxy resin composition. The epoxy resin composition thus obtained was cured under the conditions of 10° C. and 80% RH to prepare an epoxy resin cured coating film. The properties of the epoxy resin cured coating film were evaluated. The results were shown in Table 2.

EXAMPLE 6

9.0 g of the reaction product A obtained by Example of Synthesis 1 and 81.0 g of the reaction product E obtained by Example of Synthesis 5 were weighed and charged to a glass mayonnaise bottle with the volume of 145 ml. 10.0 g of benzyl alcohol as a diluent was added thereto and stirred for 2 minutes at a temperature of 60° C., whereby 100 g of "a curing agent for epoxy resins F" was obtained.

The weight ratio of isophoronediamine and 1,3-bis (aminomethyl) cyclohexane (=[1,3-BAC/IPDA]) in the curing agent for epoxy resins F thus obtained was 0.10.

The curing agent for epoxy resins F was blended with DGEBF at a proportion shown in Table 2 to obtain an epoxy resin composition. The epoxy resin composition thus obtained was cured under the conditions of 10° C. and 80% RH to prepare an epoxy resin cured coating film. The properties of the epoxy resin cured coating film were evaluated. The results were shown in Table 2.

EXAMPLE 7

The curing agent for epoxy resins A obtained in EXAMPLE 1 was blended with DGEBA at a proportion shown in Table 2 to obtain an epoxy resin composition. The epoxy resin composition thus obtained was cured under the conditions of 10° C. and 80% RH to prepare an epoxy resin cured coating film. The properties of the epoxy resin cured coating film were evaluated. The results were shown in Table 2.

EXAMPLE 8

The curing agent for epoxy resins E obtained in EXAMPLE 5 was blended with DGEBA at a proportion shown in Table 2 to obtain an epoxy resin composition. The epoxy resin composition thus obtained was cured under the conditions of 10° C. and 80% RH to prepare an epoxy resin cured coating film. The properties of the epoxy resin cured coating film were evaluated. The results were shown in Table 2.

COMPARATIVE EXAMPLE 1

3.0 g of the reaction product A obtained by Example of Synthesis 1 and 87.0 g of the reaction product B obtained by Example of Synthesis 2 were weighed and charged to a glass mayonnaise bottle with the volume of 145 ml. 10.0 g of benzyl alcohol as a diluent was added thereto and stirred for 2 minutes at a temperature of 60° C., whereby 100 g of "a curing agent for epoxy resins G" was obtained.

The weight ratio of isophoronediamine and 1,3-bis (aminomethyl) cyclohexane (=[1,3-BAC/IPDA]) in the curing agent for epoxy resins G thus obtained was 0.02.

The curing agent for epoxy resins G was blended with DGEBF at a proportion shown in Table 3 to obtain an epoxy resin composition. The epoxy resin composition thus obtained was cured under the conditions of 10° C. and 80% RH to prepare an epoxy resin cured coating film. The properties of the epoxy resin cured coating film were evaluated and the results were shown in Table 3.

COMPARATIVE EXAMPLE 2

20.0 g of the reaction product A obtained by Example of Synthesis 1 and 60.0 g of the reaction product C obtained by Example of Synthesis 3 were weighed and charged to a glass mayonnaise bottle with the volume of 145 ml. 20.0 g of benzyl alcohol as a diluent was added thereto and stirred for 2 minutes at a temperature of 60° C., whereby 100 g of "a curing agent for epoxy resins H" was obtained.

The weight ratio of isophoronediamine and 1,3-bis (aminomethyl) cyclohexane (=[1,3-BAC/IPDA]) in the curing agent for epoxy resins H thus obtained was 0.32.

The curing agent for epoxy resins H was blended with DGEBF at a proportion shown in Table 3 to obtain an epoxy resin composition. The epoxy resin composition thus obtained was cured under the conditions of 10° C. and 80% RH to prepare an epoxy resin cured coating film. The properties of the epoxy resin cured coating film were evaluated. The results were shown in Table 3.

COMPARATIVE EXAMPLE 3

90.0 g of the reaction product B obtained by Example of Synthesis 2 was weighed and charged to a glass mayonnaise bottle with the volume of 145 ml. 10.0 g of benzyl alcohol as a diluent was added thereto and stirred for 2 minutes at a temperature of 60° C., whereby 100 g of "a curing agent for epoxy resins I" was obtained.

The weight ratio of isophoronediamine and 1,3-bis (aminomethyl) cyclohexane (=[1,3-BAC/IPDA]) in the curing agent for epoxy resins I thus obtained was 0.

The curing agent for epoxy resins I was blended with DGEBF at a proportion shown in Table 3 to obtain an epoxy resin composition. The epoxy resin composition thus obtained was cured under the conditions of 10° C. and 80% RH to prepare an epoxy resin cured coating film. The properties of the epoxy resin cured coating film were evaluated. The results were shown in Table 3.

TABLE 1

|  | Example 1 | Example 2 | Example 3 | Example 4 |
|---|---|---|---|---|
| Epoxy resin composition (g) | | | | |
| Epikote 807 | 100 | 100 | 100 | 100 |
| Curing Agent Composition A | 39 | | | |
| Curing Agent Composition B | | 39 | | |
| Curing Agent Composition C | | | 45 | |
| Curing Agent Composition D | | | | 45 |
| Property of a cured coating film | | | | |
| Appearance | | | | |
| Gloss | ◎ | ◎ | ◎ | ◎ |
| Clarity | ◎ | ◎ | ◎ | ◎ |
| Leveling | ◎ | ◎ | ○ | ○ |
| Pencil Hardness | | | | |
| (1 day/4 days/7 days) | HB/H/H | HB/H/H | HB/HB/H | HB/H/H |
| Water resistance | | | | |
| (16 hours/1 day/4 days/7 days) | Δ/○/◎/◎ | Δ/○/◎/◎ | ○/○/◎/◎ | ○/○/◎/◎ |

TABLE 2

|  | Example 5 | Example 6 | Example 7 | Example 8 |
|---|---|---|---|---|
| Epoxy resin composition (g) | | | | |
| Epikote 807 | 100 | 100 | | |
| Epikote 828 | | | 100 | 100 |
| Curing Agent Composition E | 43 | | | 39 |
| Curing Agent Composition F | | 43 | | |
| Curing Agent Composition A | | | 35 | |
| Property of a cured coating film | | | | |
| Appearance | | | | |
| Gloss | ◎ | ◎ | ◎ | ◎ |
| Clarity | ◎ | ◎ | ◎ | ◎ |
| Leveling | ○ | ○ | ◎ | ◎ |
| Pencil Hardness | | | | |
| (1 day/4 days/7 days) | HB/H/H | HB/H/H | HB/H/H | F/H/H |
| Water resistance | | | | |
| (16 hours/1 day/4 days/7 days) | Δ/○/◎/◎ | ○/○/◎/◎ | Δ/○/◎/◎ | ○/○/◎/◎ |

TABLE 3

|  | Comparative Example 1 | Comparative Example 2 | Comparative Example 3 |
|---|---|---|---|
| Epoxy resin composition (g) | | | |
| Epikote 807 | 100 | 100 | 100 |
| Curing Agent Composition G | 40 | | |
| Curing Agent Composition H | | 46 | |
| Curing Agent Composition I | | | 38 |
| Property of a cured coating film | | | |
| Appearance | | | |
| Gloss | Δ | Δ | Δ |
| Clarity | Δ | ○ | Δ |
| Leveling | X | ○ | X |
| Pencil Hardness | | | |
| (1 day/4 days/7 days) | 2B/HB/H | HB/H/H | 3B/B/H |
| Water resistance | | | |
| (16 hours/1 day/4 days/7 days) | Δ/Δ/○/○ | X/X/Δ/Δ | Δ/Δ/○/○ |

What is claimed is:

1. A curing agent for epoxy resins comprising the following components (A), (B), (C) and (D) wherein the weight ratio of (D) to (C) (=(D)/(C)) in said curing agent is in the range of 0.04 to 0.22:
    (A) an epoxy adduct of isophoronediamine obtained by addition reaction of isophoronediamine with a diglycidyl compound
    (B) an epoxy adduct of 1,3-bis(aminomethyl) cyclohexane obtained by addition reaction of 1,3-bis(aminomethyl) cyclohexane with a diglycidyl compound
    (C) isophoronediamine
    (D) 1,3-bis (aminomethyl) cyclohexane.

2. The curing agent for epoxy resins according to claim 1, wherein the weight ratio of the total content of epoxy adducts to the total content of diamines (=[the total content of epoxy adducts]/[the total content of diamines]) is in the range of 0.17 to 4.2.

3. The curing agent for epoxy resins according to claim 1 or 2, wherein the reaction proportion in addition reaction of isophoronediamine with the diglycidyl compound (=[the number of amino groups]/[the number of glycidyl groups]) is in the range of 3 to 10.

4. The curing agent for epoxy resins according to claim 2, wherein the reaction proportion in addition reaction of isophoronediamine with the diglycidyl compound (=[the number of amino groups]/[the number of glycidyl groups]) is in the range of 3 to 10.

5. The curing agent for epoxy resins according to claim 1, wherein the reaction proportion in addition reaction of 1,3-bis (aminomethyl) cyclohexane with the diglycidyl compound (=[the number of amino groups]/[the number of glycidyl groups]) is in the range of 3 to 10.

6. The curing agent for epoxy resins according to claim 2, wherein the reaction proportion in addition reaction of 1,3-bis (aminomethyl) cyclohexane with the diglycidyl compound (=[the number of amino groups]/[the number of glycidyl groups]) is in the range of 3 to 10.

7. The curing agent for epoxy resins according to claim 1, wherein the diglycidyl compound added with isophoronediamine is selected from the group consisting of 4,4'-isopropylidenediphenol diglycidylether and 4,4'-methylenediphenol diglycidylether.

8. The curing agent for epoxy resins according to claim 2, wherein the diglycidyl compound added with isophoronediamine is selected from the group consisting of 4,4'-isopropylidenediphenol diglycidylether and 4,4'-methylenediphenol diglycidylether.

9. The curing agent for epoxy resins according to claim 1, wherein the diglycidyl compound added with 1,3-bis (aminomethyl) cyclohexane is selected from the group consisting of 4,4'-isopropylidenediphenol diglycidylether and 4,4'-methylenediphenol diglycidylether.

10. The curing agent for epoxy resins according to claim 2, wherein the diglycidyl compound added with 1,3-bis (aminomethyl) cyclohexane is selected from the group consisting of 4,4'-isopropylidenediphenol diglycidylether and 4,4'-methylenediphenol diglycidylether.

11. An epoxy resin composition comprising an epoxy resin and the curing agent for epoxy resins according to claim 1.

12. An epoxy resin composition comprising an epoxy resin and the curing agent for epoxy resins according to claim 2.

13. An epoxy resin cured product obtained by curing the epoxy resin composition according to claim 11.

14. An epoxy resin cured product obtained by curing the epoxy resin composition according to claim 12.

* * * * *